United States Patent
Wellmann

(10) Patent No.: US 6,282,418 B1
(45) Date of Patent: Aug. 28, 2001

(54) METHOD, TELECOMMUNICATION SYSTEM, AND PROCESSOR DEVICE

(75) Inventor: Hans Wellmann, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/354,819

(22) Filed: Jul. 19, 1999

(30) Foreign Application Priority Data

Jul. 20, 1998 (EP) .................................................. 98440157

(51) Int. Cl.⁷ ........................................................ H04Q 7/20
(52) U.S. Cl. ........................ 455/433; 455/33.1; 455/411; 455/54.1; 379/63; 379/59
(58) Field of Search ..................... 455/433, 33.1, 455/411, 54.1, 33.2; 379/63, 60, 59, 62

(56) References Cited

U.S. PATENT DOCUMENTS

| | | | |
|---|---|---|---|
| 5,241,598 | * 8/1993 | Raith | 380/21 |
| 5,504,804 | * 4/1996 | Widmark et al. | 379/63 |
| 5,574,774 | 11/1996 | Ahlberg et al. . | |
| 5,815,810 | * 9/1998 | Gallant et al. | 455/433 |

FOREIGN PATENT DOCUMENTS

| | | |
|---|---|---|
| 0 823 809 A2 | 2/1998 | (EP) . |
| WO 97/23973 | 7/1997 | (WO) . |
| WO 97/33421 | 9/1997 | (WO) . |
| WO 98/06201 | 2/1998 | (WO) . |

OTHER PUBLICATIONS

Kellner, A. et al.: "PADIS–An Automatic Telephone Switchboard and Directory Information System" Speech Communication, vol. 23, No. 1–2, Oct. 1997, p. 95–111 XP004117212.

Lau, R. et al.: "WebGALAXY: Beyond Point and Click—A Conversational Interface to a Browser", Computer Networks and ISDN Systems, vol. 29, 20. 8–13, Sep. 1997, pp. 1385–1393 XP004095333.

\* cited by examiner

*Primary Examiner*—Thanh Cong Le
*Assistant Examiner*—Lana Le
(74) *Attorney, Agent, or Firm*—Sughrue, Mion, Zinn, Macpeak & Seas, PLLC

(57) ABSTRACT

Known methods and systems for providing information to a user, like information about a user's profile in a mobile telecommunication network, are based on a telecommunication switch like a MSC directly communicating with a telecommunication database like a HLR. By placing a processor device between switch and database, and using speech connections between user and switch and switch and device and vice versa, and using data connections between device and database and vice versa, the user-friendlyness is improved, when signalling info is exchanged via said speech connections, as well as when speech is exchanged via said speech connections, both for interrogation and/or updates and/or modification and for said providing of information.

12 Claims, 1 Drawing Sheet

METHOD, TELECOMMUNICATION SYSTEM, AND PROCESSOR DEVICE

BACKGROUND OF THE INVENTION

The invention relates to a method for providing information to a user, which method comprises the steps of
- transmitting a request signal from the user to a telecommunication switch,
- in response to said request signal, transmitting a data signal to a telecommunication database, and
- in response to said data signal, transmitting an information signal from said telecommunication database via said telecommunication switch to said user.

Such a method is of common general knowledge and, in general, based on said telecommunication switch (like for example a Mobile Switching Center or MSC) and said telecommunication database (like for example a Home Location Register or HLR) directly communicating with each other. Said user, who for example wants to investigate or update his profile like a call forwarding situation, interrogates said database by generating said request signal via the keyboard or keypad of his handset, which request signal is transmitted via a signalling channel to said telecommunication switch, which converts said request signal into said data signal and transmits said data signal via a data connection to said telecommunication database. This telecommunication database then sends back said information signal via said telecommunication switch to the user, who can check (certain settings of) his profile on the display of his handset.

SUMMARY OF THE INVENTION

This method is disadvantageous, inter alia, because of not being userfriendly and because of limitations imposed by the menue options of the handset.

It is an object of the invention, inter alia, to provide a method as described in the preamble which is more user-friendly and which offers more possibilities.

Thereto, the method according to the invention is characterised in that the step of transmitting said data signal to said telecommunication database comprises the steps of
- transmitting said request signal from said telecommunication switch to a processor device via a speech connection,
- converting said request signal into said data signal in said processor device, and
- transmitting said data signal to said telecommunication database via a data connection,
- whereby said request signal is transmitted from said user to said telecommunication switch via a speech connection.

By placing a processor device (like for example a server) between said telecommunication switch and said telecommunication database, and using speech connections between handset and telecommunication switch and telecommunication switch and processor device and vice versa, and using data connections between processor device and telecommunication database and vice versa, the user can get more possibilities and options, and the user-friendlyness can easily be increased. The telecommunication switch does not have to convert the request signal into the data signal any longer, but only has to receive and transmit the request signal for example in the form of signalling information via both speech connections. The converting then is done by the processor device, which in general will be more suited to handle such a conversion than an ordinary telecommunication switch.

The method according to the invention thus solves the problem, inter alia, of creating more possibilities and a higher user-friendlyness, by using a server between telecommunication switch and telecommunication database.

The invention is based on the insight, inter alia, that a telecommunication switch is designed for switching speech connections, and that a processor device could be used for performing special functions.

A first embodiment of the method according to the invention is characterised in that the step of transmitting said information signal from said database via sold telecommunication switch to said user comprises the steps of
- transmitting said information signal from said telecommunication database to said processor device via a data connection, and
- transmitting said information signal from said processor device via said telecommunication switch to said user via a speech connection.

According to this first embodiment, the information signal is not transmitted directly from the telecommunication database to the telecommunication switch but indirectly via the processor device.

A second embodiment of the method according to the invention is characterised in that the step of transmitting said information signal from said database via said telecommunication switch to said user comprises the step of
- converting said information signal into a speech signal in said processor device.

According to this second embodiment, the user receives his information in the form of speech.

A third embodiment of the method according to the invention is characterised in that said request signal comprises a further speech signal.

According to this third embodiment, the user makes his request in the form of speech.

The invention further relates to a telecommunication system for providing information to a user, which telecommunication system comprises
- a telecommunication switch for receiving a request signal from the user,
- a telecommunication database for, in response to said request signal, receiving a data signal, and for, in response to said data signal, transmitting an information signal via said telecommunication switch to said user.

The telecommunication according to the invention is characterised in that the telecommunication system comprises
- a processor device for receiving said request signal from said telecommunication switch via a speech connection, and for converting said request signal into said data signal, and for transmitting said data signal to said telecommunication database via a data connection,
- whereby said request signal is transmitted from said user to said telecommunication switch via a speech connection.

A first embodiment of the telecommunication system according to the invention is characterised in that said information signal is transmitted from said telecommunication database to said processor device via a data connection, whereby said information signal is transmitted from said processor device via said telecommunication switch to said user via a speech connection.

A second embodiment of the telecommunication system according to the invention is characterised in that said information signal is converted into a speech signal in said processor device.

A third embodiment of the telecommunication system according to the invention is characterised in that said request signal comprises a further speech signal.

The invention yet further relates to a processor device for use in a telecommunication system system for providing information to a user, which telecommunication system comprises a telecommunication switch for receiving a request signal from the user, a telecommunication database for, in response to said request signal, receiving a data signal, and for, in response to said data signal, transmitting an information signal via said telecommunication switch to said user.

The processor device according to the invention is characterised in that the processor device comprises receiving means for receiving said request signal from said telecommunication switch via a speech connection, converting means for converting said request signal into said data signal, and transmitting means for transmitting said data signal to said telecommunication database via a data connection.

A first embodiment of the processor device according to the invention is characterised in that the processor device comprises further receiving means for receiving said information signal from said telecommunication database via a data connection, and further transmitting means for transmitting said information signal via said telecommunication switch to said user via a speech connection.

A second embodiment of the processor device according to the invention is characterised in that the processor device comprises further converting means for converting said information signal into a speech signal.

A third embodiment of the processor device according to the invention is characterised in that the converting means comprise speech detecting means for detecting a further speech signal, said request signal comprising said further speech signal.

BRIEF DESCRIPTION OF THE DRAWINGS

The invention will be explained in greater detail at the hand of an embodiment disclosed in the drawing, whereby FIG. 1 discloses a telecommunication system according to the invention comprising a processor device according to the invention.

DETAILED DESCRIPTION OF THE INVENTION

Figure 1:
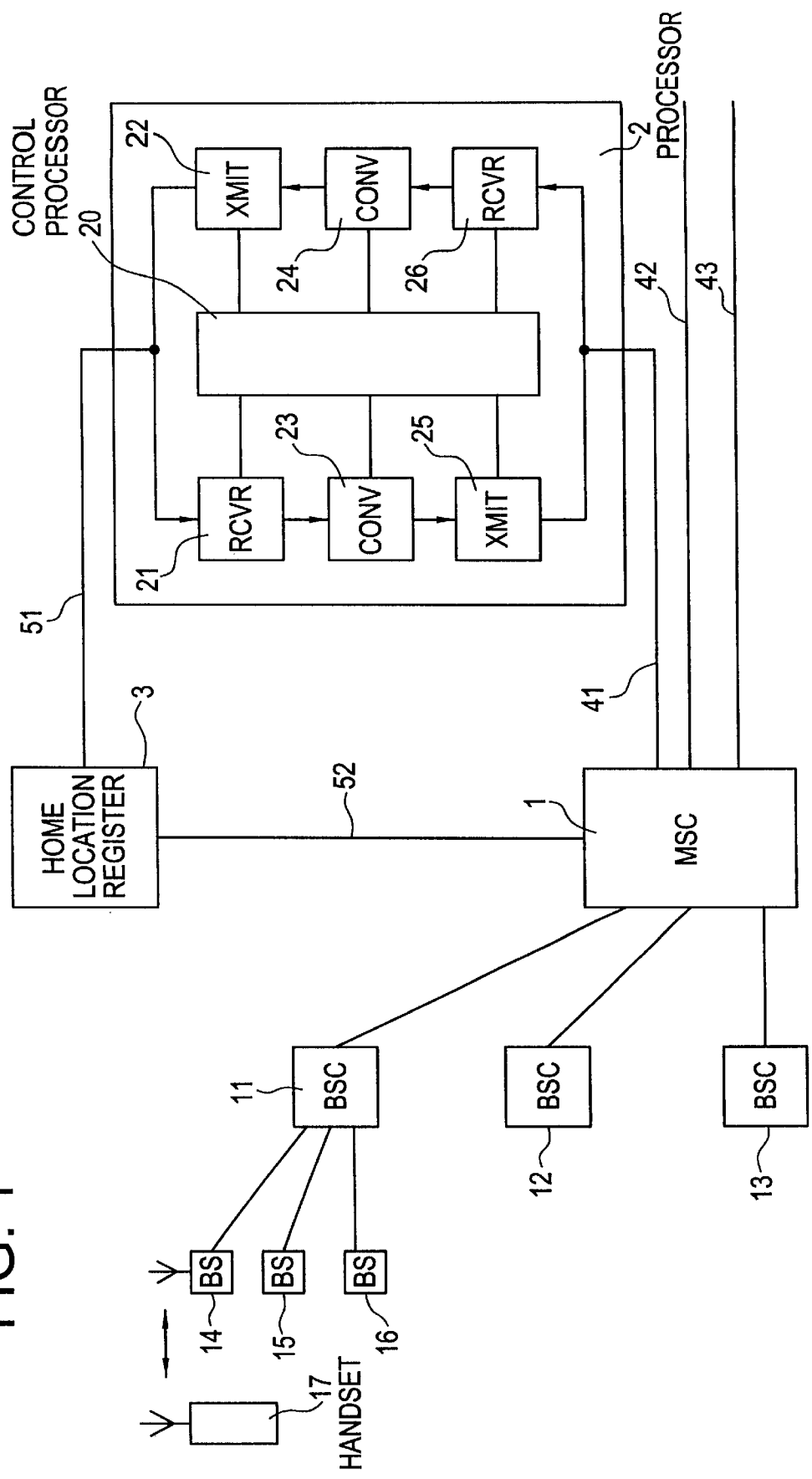

The telecommunication system according to the invention disclosed in FIG. 1 comprises a telecommunication switch 1 like for example a Mobile Switching Center or MSC, of which a first side is coupled to three Base Station Controllers or BSCs 11, 12 and 13. BSC 11 is coupled to three Base Stations or BSs 14, 15 and 16, and BS 14 is able to communicate with a handset 17. A second side of switch 1 is coupled via a speech connection 41 to a first in/output of a processor device 2 like for example a server, and is coupled via speech connections 42 and 43 to for example a fixed network. A third side of switch 1 is coupled via a data connection 52 to a first side of a telecommunication database 3 like for example a Home Location Register or HLR, of which a second side is coupled via a data connection 51 to a second in/output of the processor device 2.

Processor device 2 comprises receiving means 26 for receiving a request signal from switch 1 via speech connection 41, of which receiving means 26 an input is coupled to the first in/output and of which receiving means 26 an output is coupled to an input of conversion means 24 for converting said request signal into a data signal. An output of conversion means 24 is coupled to an input of transmitting means 22 for transmitting said data signal to database 3 via data connection 51. An output of transmitting means 22 is therefore coupled to the second in/output. Conversion means 24 possibly comprise speech detecting means for detecting a further speech signal for example forming part of said request signal. Processor device further comprises further receiving means 21 for receiving an information signal from database 3 via data connection 51, of which further receiving means 21 an input is coupled to the second in/output and of which further receiving means 21 an output is either coupled to an input of further converting means 23 for converting said information signal into a speech signal, or, in case further converting means 23 are not used, is coupled to an input of further transmitting means 25 for transmitting said information signal via speech connection 41 to switch 1. An output of further converting means 23, when used, is then coupled to said input of further transmitting means 25, of which an output is coupled to said first in/output. Processor device 2 is also provided with a control processor 20 coupled to each one of said means 21–26 for controlling the operation of processor device 2.

The telecommunication system as shown in FIG. 1 functions as follows. A user who wants to be provided with information, like for example about his call forwarding situation, dialls a predefined number via his handset 17, which predefined number defines processor device 2 as its destination. In response to said predefined number a speech connection is set up between handset 17 and processor device 2 via BS 14 and BSC 11 and switch 1. This setting up could for example be done after communication has taken place between switch 1 and database 3 via data connection 52 (for example for billing purposes).

According to a first embodiment, the user then generates the request signal in the form of signalling information by for example using the keyboard of handset 17, which request signal is supplied to converting means 24 via receiving means 26 and the first in/output and speech connection 41. Receiving means 26 convert this request signal in the form of signalling information into the data signal, which via transmitting means 22 and the second in/output and data connection 51 is supplied to database 3. In response to this data signal, database 3 generates the information signal in the form of data, which information signal is transmitted to handset 17 via data connection 51, the second in/output, further receiving means 21, further transmitting means 25, the first in/output, speech connection 41, switch 1, BSC 11 and BS 14. Further converting means 23 could possibly be used for converting said information signal in the form of data into a further information signal in the form of further data which for example is more suited for speech connection 41.

According to a second embodiment, further converting means 23 convert the information signal into a speech signal, and converting means 24 comprise speech detecting means for detecting a further speech signal. After the setting up of said speech connection, the user then generates the request signal in the form of said further speech signal via handset 17, which request signal is supplied to converting means 24 via receiving means 26 and the first in/output and speech connection 41. Converting means 24 convert this request signal in the form of said further speech signal into the data signal, which via transmitting means 22 and the second in/output and data connection 51 is supplied to database 3. In response to this data signal, database 3 generates the information signal in the form of data, which information signal is supplied to further converting means 23 via data connection 51, the second in/output and further receiving means 21. Further converting means 23 convert the information signal into said speech signal, which is transmitted to handset 17 via further transmitting means 25, the first in/output, speech connection 41, switch 1, BSC 11 and BS 14.

According to a third and fourth embodiment, in one of both directions a speech signal is transmitted and in the other direction a data signal is transmitted.

Compared to prior art, which for example is based upon using a signalling channel between handset and switch, the invention being based upon using a speech connection between handset and switch, with a processor device being located between switch and database, offers more possibilities, not just the possible use of speech, but also a broader bandwidth, both resulting in more user-friendlyness.

The network operator can determine the costs of the use of said speech connection for the user, like no billing at all, or billing per time-unit or per transaction, possibly in combination with a threshold with respect to time-units and/or number of calls made in a certain period. Further, the network operator does not have to adapt his switch, apart from defining the processor device as the destination of the predefined number. Both aspects are great advantages.

The term 'providing information' should be regarded to be as broad as possible, and could for example comprise the amending of data stored in the database by the user, in which case the information provided to the user may comprise either an overview of existing data which (partly) is to be amended or (control) data which indicates the amendments. The term 'telecommunication' should also be regarded to be as broad as possible, and comprises mobile systems, cordless systems and fixed systems, whereby the location of the processor device between switch and database, with a data connection between processor device and database, and with a speech connection between processor device and switch, and possibly with a data connection between switch and database, characterise this invention.

Said processor device could possibly be combined with either the database or the switch, or could be located near the database or the switch, or not.

With respect to said database suddenly comprising two in/outputs instead of one in/output, it is observed that this is of common general knowledge to a person skilled in the art, who for example will install an additional access (multiplexing/demultiplexing) function inside the database to get an extra in/output for accessing/inserting data. In case a database is not to be amended or cannot be amended, said additional access (multiplexing/demultiplexing) function could be installed outside said database. With respect to said processor device and/or said database, each term 'in/output' could for example be either a real in/output to be coupled to a bidirectional connection, or a separate input and output, each one to be coupled to a unidirectional connection, etc.

What is claimed is:

1. Method for providing information to a user, which method comprises the steps of transmitting a request signal from the user to a telecommunication switch, in response said request signal, transmitting a data signal to a telecommunication database, and in response to said data signal, transmitting an information signal from said telecommunication database via said telecommunication switch to said user, characterised in that the step of transmitting said data signal to said telecommunication database comprises the steps of transmitting said request signal from said telecommunication switch to a processor device via a speech connection, converting said request signal into said data signal in said processor device, and transmitting said data signal to said telecommunication database via a data connection, whereby said request signal is transmitted from said user to said telecommunication switch via a speech connection.

2. Method according to claim 1, characterised in that the step of transmitting said information signal from said database via said telecommunication switch to said user comprises the steps of transmitting said information signal from said telecommunication database to said processor device via a data connection, and transmitting said information signal from said processor device via said telecommunication switch to sold user via a speech connection.

3. Method according to claim 2, characterised in that the step of transmitting said information signal from said database via said telecommunication switch to said user comprises the step of converting said information signal into a speech signal in said processor device.

4. Method according to claim 1, characterised in that said request signal comprises a further speech signal.

5. Telecommunication system for providing information to a user, which telecommunication system comprises a telecommunication switch for receiving a request signal from the user, a telecommunication database for, in response to said request signal, receiving a data signal, and for, in response to said data signal, transmitting an information signal via said telecommunication switch to said user, characterised in that the telecommunication system comprises a processor device for receiving said request signal from said telecommunication switch via a speech connection, and for converting said request signal into said data signal, and for transmitting said data signal to said telecommunication database via a data connection, whereby said request signal is transmitted from said user to said telecommunication switch via a speech connection.

6. Telecommunication system according to claim 5, characterised in that said information signal is transmitted from said telecommunication database to said processor device via a data connection, whereby said information signal is transmitted from said processor device via said telecommunication switch to said user via a speech connection.

7. Telecommunication system according to claim 6, characterised in that said information signal is converted into a speech signal in said processor device.

8. Telecommunication system according to claim 5, characterised in that said request signal comprises a further speech signal.

9. Processor device for use in a telecommunication system system for providing information to a user, which telecommunication system comprises a telecommunication switch for receiving a request signal from the user, a telecommunication database for, in response to said request signal, receiving a data signal, and for, in response to said data signal, transmitting an information signal via said telecommunication switch to said user, characterised in that the processor device comprises receiving means for receiving said request signal from said telecommunication switch via a speech connection, converting means for converting said request signal into said data signal, and transmitting means for transmitting said data signal to said telecommunication database via a data connection.

10. Processor device according to claim 9, characterised in that the processor device comprises further receiving means for receiving said information signal from said telecommunication database via a data connection, and further transmitting means for transmitting said information signal via said telecommunication switch to said user via a speech connection.

11. Processor device according to claim 10, characterised in that the processor device comprises further converting means for converting said information signal into a speech signal.

12. Processor device according to claim 9, characterised in that the converting means comprise speech detecting means for detecting a further speech signal, said request signal comprising said further speech signal.

* * * * *